United States Patent Office 3,167,284
Patented Jan. 26, 1965

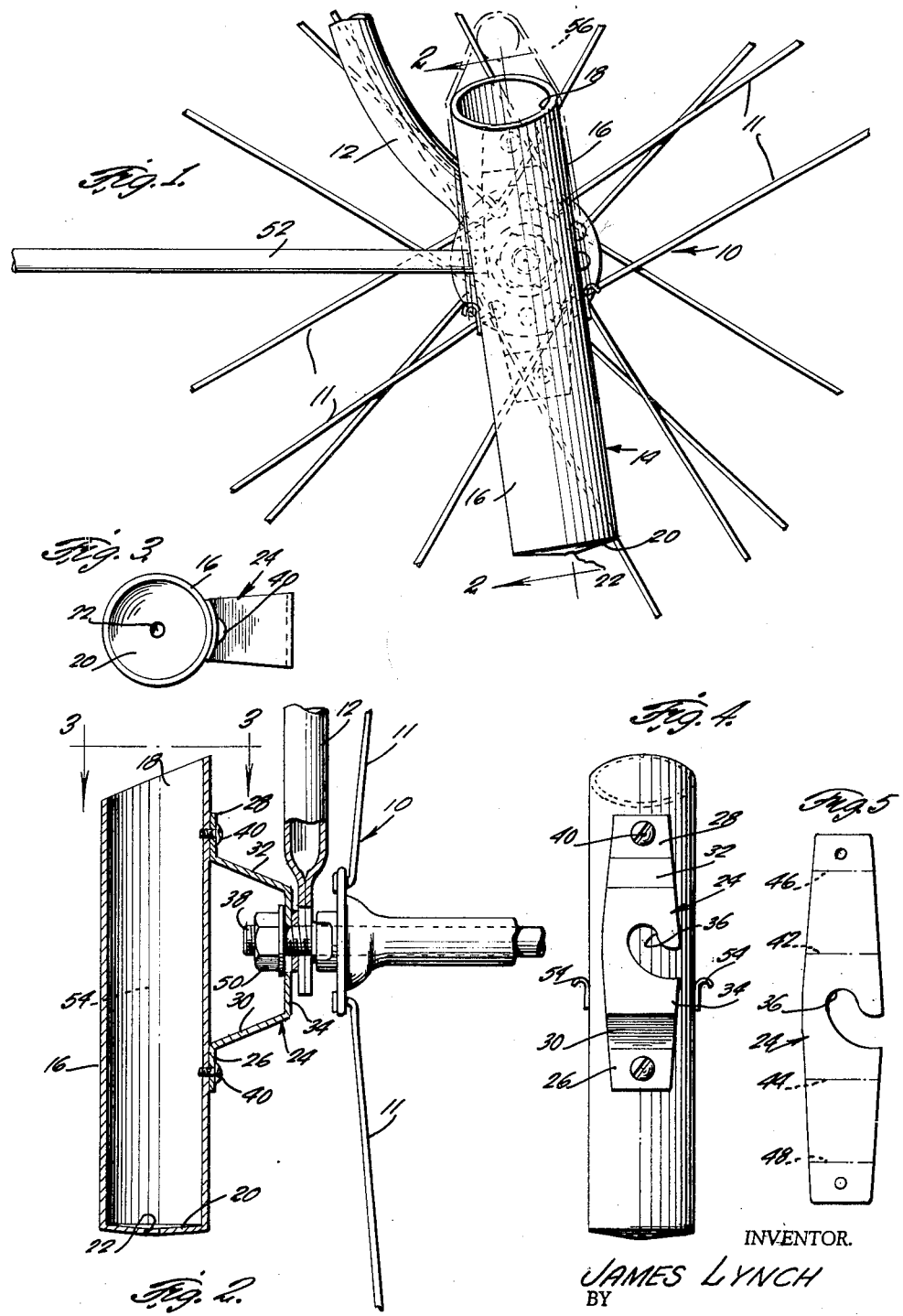

3,167,284
FISHING ROD CARRIER FOR A BICYCLE
James Lynch, 79 Wallace Ave., Fairview, Mass.
Filed Aug. 24, 1962, Ser. No. 219,178
1 Claim. (Cl. 248—40)

The present invention relates to a fishing rod carrier for a bicycle.

An object of the present invention is to provide a carrier for attachment to a bicycle by means of which a fishing rod may be carried, and in particular to a carrier in which the fishing rod can be carried in an erect condition ready for use.

Another object of the present invention is to provde a carrier for attachment to a bicycle which is in plain view of the user of the bicycle so that the fishing rod carried thereby cannot be inadvertently lost without being noticed by the user of the bicycle.

A further object of the present invention is to provide a carrier for attachment to a bicycle which lends itself to the support of all types of fishing rods having handles, whether or not such a handle is included in a reel structure or the reel structure is included in the portion of the fishing rod inwardly of the handle.

These and other objects and advantages of the present invention will be fully apparent from the following description when taken in connection with the annexed drawing, in which:

FIGURE 1 is an elevational view of a portion of a bicycle wheel and adjacent frame part, with the carrier of the present invention installed thereon, FIGURE 2 is a view taken on the line 2—2 of FIGURE 1, FIGURE 3 is a view taken on the line 3—3 of FIGURE 2, FIGURE 4 is an elevational view, and FIGURE 5 is a plan view of the bracket employed with the invention, shown in flat condition before bending.

Referring in detail to the drawing, in which like numerals indicate like parts throughout the several views, the reference numeral 10 designates generally a bicycle wheel, only part of which is shown. The numeral 12 designates a portion of the frame which supports the wheel 10.

The device of the present invention is designated generally by the reference numeral 14 and it includes an upright tube 16 having the upper end open, as at 18, and the lower end closed, as at 20.

The lower end 20 of the tube 16 is provided with a drain hole 22.

The device 14 includes a U-shaped bracket 24 having the portions of its legs adjacent the free ends thereof bent outwardly to form feet 26 and 28. The remainder portions of the legs 30 and 32 diverge outwardly from the bight 34.

The bight 34 is provided with a curved slot 36 extending inwardly from one side edge thereof. The slot 36 is of a width to receive therein the projecting end portion of the axle 38 of the wheel 10.

Machine screws 40, or other conventional fastening means, secure the feet 26 and 28 to the side of the tube 16 intermediate the ends of the latter.

In FIGURE 5, the bracket 24 is shown in unbent condition with full lines 42 and 44 defining the bight 34 and with other full lines 46 and 48 defining the feet 26 and 28.

In use, the bracket 24 is assembled in the side of the tube 16 and the nut 50 is loosened from its position normally holding the bicycle fender brace 52 and the frame portion 12 on the axle 38 so that the portion of the axle 38 exteriorly of the brace 52 may be slipped into the slot 36 of the bracket 24. Tightening of the nut 50 secures the tube 16 in its upright position ready for the reception therein of the handle of a fishing rod or other device to be carried by the invention.

While the tube 16 is shown with a closed lower end 20, it is contemplated that the tube may be open at both ends for the insertion thereinto of a fishing rod having a reel thereon adjacent to and inwardly of the handle. Such a tube would receive the handle and the reel would prevent sliding movement of the handle further into the tube than necessary.

It is contemplated that the tube be made of a rigid material such as a relatively hard plastic, a lightweight metal such as aluminum, magnesium, or of any suitable material which may be extruded or formed conventionally on machinery for making tubular articles.

Preferably, the bracket 24 is of a bendable material although it is contemplated that such a bracket may be formed by molding when a plastic material is used or in any conventional manner according to the material employed.

The upper end of the tube 16, at 18, is cut on a slant, permitting the easy insertion thereinto of the fishing rod handle (not shown).

The slant of the open top is away from the wheel 10 so that the reel of a fishing rod, when the rod handle is inserted in the tube 16, engages the sloping wall and is prevented from rotating into the spokes 11 of the wheel 10.

A pair of opposed hooks 54 are secured to the outside of the tube 16 for receiving thereunder the loop ends of a stretched rubber band 56, which is employed to engage the reel of a fishing rod and to hold the rod handle down in the tube 16.

Obviously, the internal diameter of the tube 16 may be of such size as to accommodate any particular fishing rod or all fishing rods as desired and while only a preferred embodiment of the present invention is shown and described, other embodiments are contemplated and numerous changes and modifications may be made therein without departing from the spirit of the invention as set forth in the appended claim.

What is claimed is:

A holder for a fishing rod handle adapted to be mounted on a bicycle wheel and comprising an upright tube having the upper end thereof open and the lower end at least partially closed, a U-shaped bracket having its ends disposed intermediate said tube ends and having the free ends of its legs bent outwardly to form feet, means securing said feet to said tube, said bight of said bracket including aperture means for receiving therein the projecting end portion of a bicycle wheel axle, the upper end of said tube being tapered downwardly in a direction away from said bracket transversely of said tube and away from the bicycle wheel to define a support surface for a fishing reel carried by the fishing rod handle.

References Cited by the Examiner

UNITED STATES PATENTS

| | | | |
|---|---|---|---|
| 551,570 | 12/95 | Bean | 248—300 |
| 1,575,270 | 3/26 | Jankowsky | 248—224 |
| 2,068,054 | 1/37 | Haislip | 248—40 X |
| 2,912,196 | 11/59 | Johnson | 248—42 |

FOREIGN PATENTS 444,786  1949  Italy.

CLAUDE A. LE ROY, *Primary Examiner.*